United States Patent
Suarez

[11] 3,968,981
[45] July 13, 1976

[54] VARIABLE SIZE TRAILER HITCH ASSEMBLY

[76] Inventor: Roderick A. Suarez, P.O. Box 11, Forest Park, Ga. 30050

[22] Filed: Aug. 28, 1975

[21] Appl. No.: 608,668

[52] U.S. Cl. .............................................. 280/511
[51] Int. Cl.² ........................................... B60D 1/06
[58] Field of Search .................. 280/511, 512, 513; 403/135, 139, 140

[56] References Cited
UNITED STATES PATENTS

| | | |
|---|---|---|
| 2,516,555 | 7/1950 | Dear .................................. 280/511 |
| 3,307,857 | 3/1967 | Robertson ........................... 280/511 |
| 3,630,546 | 12/1971 | Church ............................... 280/511 |
| 3,862,807 | 1/1975 | Doden ................................ 403/135 |

*Primary Examiner*—Robert R. Song
*Attorney, Agent, or Firm*—Newton, Hopkins & Ormsby

[57] ABSTRACT

A trailer hitch assembly including a tow-carrying upstanding ball and an adaptor removably mounted on the ball to increase the effective diameter of the ball. The socket of a coupler of a trailer is mounted over the adaptor.

8 Claims, 2 Drawing Figures

VARIABLE SIZE TRAILER HITCH ASSEMBLY

BACKGROUND OF THE INVENTION

1. Field of the Invention

This invention relates to a trailer hitch assembly and is more particularly concerned with an adaptor for the ball of a trailer hitch so as to enlarge the effective diameter of the ball for receiving the sockets of a coupler of a trailer which normally would be received by a larger size ball.

2. Description of the Prior Art

In the past, trailer hitches having upstanding balls have been extensively used throughout the United States for towing boat trailers, horse trailers, utility trailers, motorcycle trailers, and numerous other types of trailers which are towed behind a vehicle. There are, however, at least two different sizes of balls for the trailer hitch, one being approximately 1 and ⅞ inches in diameter and the other being approximately 2 inches in diameter. Thus, a person who normally uses the trailer hitch for towing a small boat trailer would be unable to tow a larger horse trailer without substituting a larger ball in place of the ball mounted on the trailer hitch.

The present invention contemplates the use of an adaptor removably mounted on the small ball so as to increase the effective diameter of the ball to the larger size ball.

The Applicant is aware of the following prior art patents: U.S. Pat. Nos. 831,464; 1,889,297; 2,438,149; 2,517,176; 2,911,233; 3,139,291; 3,307,859; and 3,630,546.

SUMMARY OF THE INVENTION

Briefly described, the present invention includes an adaptor with a plurality of radially extending, resilient, clawlike prongs extending from a central hub in an arcuate path. The adaptor is removably inserted over the ball of a conventional trailer hitch and the socket of the coupling of a trailer fits on the outer surface of the adaptor.

DESCRIPTION OF THE PREFERRED EMBODIMENT

Figure 1:
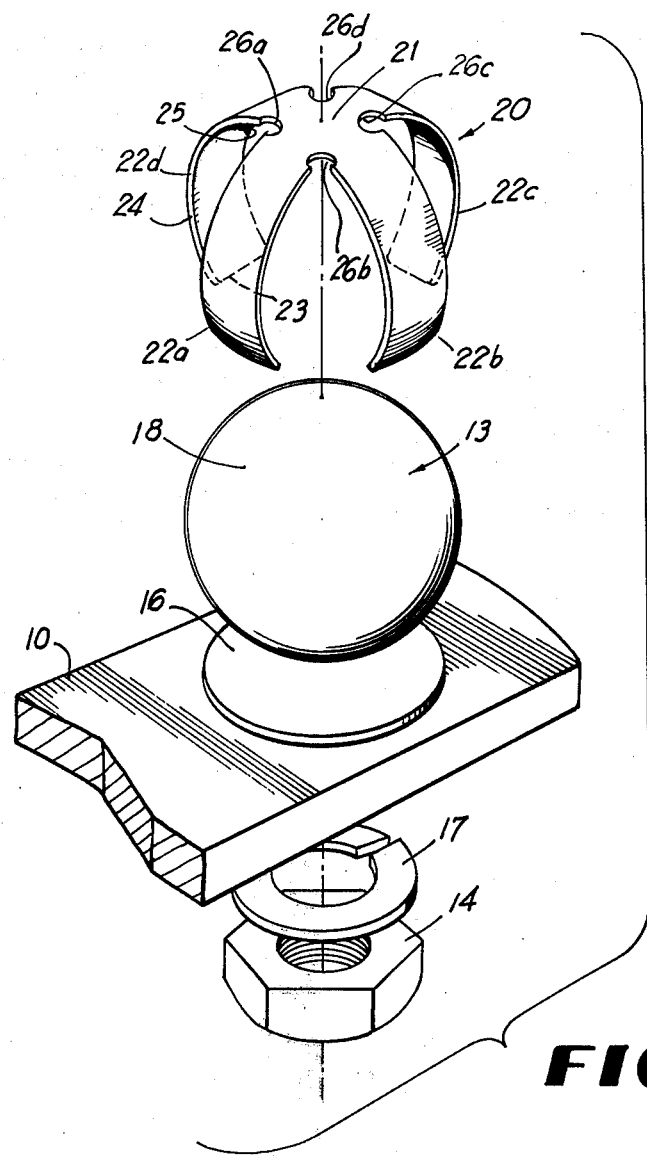
FIG. 1 is a fragmentary exploded perspective view of a conventional trailer hitch receiving the adaptor of the present invention thereon.

Referring now in detail to the embodiment chosen for the purpose of illustrating the present invention, numeral 10 denotes the horizontal disposed tongue of a conventional trailer hitch which is mounted to the rear portion of a vehicle and protrudes rearwardly therefrom. The end portion of the tongue 10 is provided with a central hole 11 through which projects the externally threaded shank 12 of the trailer hitch ball 13. The shank 12 receives a lock washer 17 and a nut 14 on the lower side of the tongue 10 so as to clamp the ball 13 in place in an upstanding position. The ball 13 has an upstanding spherical body 18 provided at its base with a circular neck 19 joining body 18 to a cylindrical upwardly tapered skirt 16.

According to the present invention a symmetrical adaptor, denoted generally by numeral 20, is provided over the surface of the body 18 of ball 13. This adaptor 20 includes a central hub or crown 21 which is either flat or spherical to conform to the shape of body 18. A plurality of identical, arcuate, claw-like, radially extending tongs or fingers 22a, 22b, 22c and 22d radiate from hub 21 and are disposed in circumferentially spaced relationship, spaced 90 degrees from each other, whereby finger 22a is diametrically opposed to 22c and finger 22b is diametrically opposed to finger 22d, as illustrated in FIG. 1.

Each of the fingers 22a, 22b, 22c and 22d is of uniform width throughout substantially its entire length and is integrally joined by its proximal end, to the hub 21.

The distal or lower end or edge, such as end 23, of finger 22d, extends transversely between the lower ends of the side edges, such as side edge 24 and side edge 25, and is curved at its corners where it merges with these side edges 24 and 25. At the proximal end of each of the fingers 22a, 22b, 22c and 22d, where opposed pairs of edges, such as edges 24 and 25, converge, there are circular holes, designated by numerals 26a, 26b, 26c and 26d. Thus, the side edges, adjacent the proximal end portion of each arm 26a, 26b, 26c and 26d, taper inwardly toward each other and then curve arcuately so as to merge with the side edges of the proximal end of the next adjacent fingers 22a, 22b, 22c or 22d, as the case may be. The purpose of the holes 26a, 26b, 26c and 26d is to prevent notch embrittlement at the junction or corners between the two adjacent fingers 22a, 22b, 22c and 22d. Hence, the proximal end of the fingers 22a, 22b, 22c and 22d are of reduced width as compared to the remainder of the finger. The inner surface of each finger 22a, 22b, 22c and 22d is preferably concaved and spherical, conforming to the spherical shape of the outer surface of body 18. Furthermore, the outer surface of each of fingers 22a, 22b, 22c and 22d is provided with a spherical surface. The spherical surfaces of each finger 22a, 22b, 22c and 22d are concentric with the spherical surfaces of the other fingers.

The adaptor 20 is of uniform thickness throughout being approximately 1/16 inch thick and is preferably made of spring steel with the lower ends or edges, such as edge 23, spaced circumferentially and diametrically from each other and terminating in a common radial plane. The space between the ends of the opposed fingers 22a and 22c, and also 22b and 22d is greater than the diameter of the neck 19.

The axial or vertical distance from the hub 21 to the plane of the lower ends of the fingers 22a, 22b, 22c and 22d is substantially less than the diameter of the body 18 but is greater than the radius of body 18 so that, when installed on the ball body 18, the fingers yieldably flex outwardly as the adaptor 20 is urged downwardly on body 18 and then spring inwardly after their ends pass the maximum diameter of the body 18.

When used, the adaptor 20 is urged downwardly the lower edges, such as edge 23, ride on the surface of body 18 so as to deform the fingers outwardly, the fingers pivoting about their proximal ends. The inside diameter of the adaptor 20 is slightly smaller than the diameter of body 18 so that, when received on the body 18, the fingers snugly grasp the body 18, the inner surfaces of the fingers 22a, 22b, 22c and 22d being contiguous with the other periphery of body 18.

Figure 2:
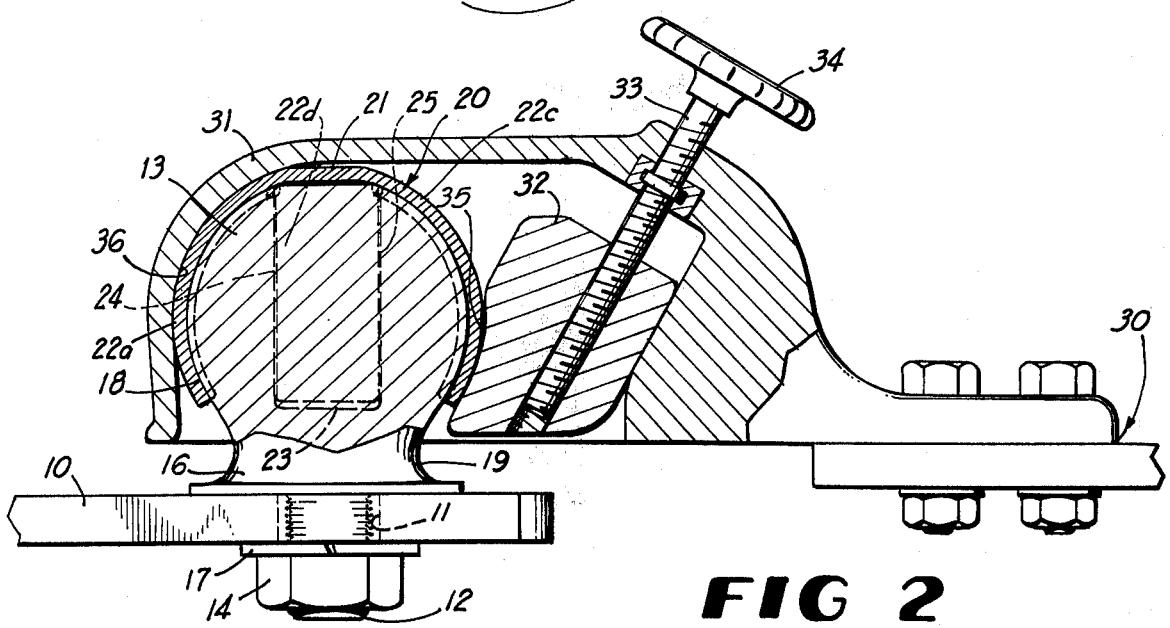
FIG. 2 is a fragmentary side elevational view of the trailer hitch and adaptor of FIG. 1, receiving the socket of a coupling of a trailer to be towed by the trailer hitch.

As seen in FIG. 2 the trailer denoted generally by numeral 30 includes a coupling 31 provided with the conventional movable locking block or lower jaw 32 which is manipulated by a lock shaft 33 provided with a handle 34. It will be understood by those skilled in the art that the locking block 32 is usually provided with a spherical concaved surface 35. Also, the coupling 31 is provided with a concaved spherical socket 36 which is for encompassing the body of a ball.

When the adaptor 20 is installed over the body 18, the hub 21 is received on top of the body 18 and the fingers 22a, 22b, 22c and 22d extend downwardly around body 18, the inside spherical dimension of adaptor 20 conforming to the spherical surface of body 18 so that the fingers 22a, 22b, 22c and 22d respectively, provide uniform thickness shims which increase the effective diameter of the ball 13, i.e., body 18 to the diameter of a larger ball (not shown) which would normally have to be substituted for ball 13 to receive coupling 31. Both the inside diameter of the adaptor 20 and its outside diameter are concentric with the surface of body 18. Thus, the ball 13 is adapted to receive coupling 31.

The coupling 31 is installed over the adaptor 20 in the usual way, i.e., with the block 32 loose. Thereafter, the handle 34 is manipulated to lock block 32 in place. This clamps the coupling 31 onto the adaptor 20.

When it is again desired to use the trailer hitch ball 13 for towing a trailer with a smaller coupling socket, the trailer 30 is removed from the adaptor 20 and the adaptor 20 is removed from the ball 13.

The adaptor 20 is quite inexpensively manufactured from rigid sheet metal which is stamped in a flat condition and then is formed to the spherical condition depicted in FIGS. 1 and 2. When initially in a flat condition, the side edges, such as edges 24 and 25, are straight, the side edges of fingers 22a and 22c being aligned with and parallel with each other and the side edges of fingers 22b and 22d being aligned and parallel to each other and perpendicular to the side edges of fingers 22a and 22c. Hence, these side edges, when the adaptor 20 is spherical, are in parallel vertical planes for each opposed pair of fingers, the planes of one pair being perpendicular to the planes of the other pair.

What is claimed is:

1. An adaptor for being received over the ball of a trailer hitch for increasing the effective diameter of the spherical surface of the ball, comprising a hub and a plurality of fingers radiating from said hub, said fingers each being arcuate so as to conform to and be received on the outer surface of the spherical ball.

2. The adaptor defined in claim 1 wherein each of said fingers is arcuate, throughout substantially its length, and the ends of said fingers are spaced apart by a distance greater than the diameter of the neck of the ball of the trailer hitch.

3. The adaptor defined in claim 2 wherein said fingers are circumferentially equally spaced from each other.

4. The structure defined in claim 1 wherein said fingers are of uniform width throughout substantially their entire length.

5. The adaptor defined in claim 4 wherein said fingers are each of reduced width at their proximal ends, the converging end portions of the adjacent fingers being provided with arcuate surfaces defining a circular opening.

6. The structure defined in claim 1 wherein each of said fingers is identical and said adaptor is symmetrical.

7. In a trailer hitch assembly of the type having a tongue which supports a ball extending from the surface of the tongue, said ball having a body with a spherical surface, the combination therewith of:
    an adaptor extending over and received on said surface, said adaptor being of rigid material, snugly encompassing a portion of said surface and providing with said body a rigid outer generally spherical surface of larger effective diameter than said spherical surface of said body, said adaptor and said ball, when the adaptor extends over said surface of said body, being adapted to receive a coupling thereon with a larger diameter socket than would normally be received on the ball.

8. The trailer hitch assembly defined in claim 7 wherein said adaptor includes a hub and claw-like arcuate fingers radiating from said hub, said hub being disposed on the top of said body, and said fingers extending downwardly therefrom along the outer surface of said body.

* * * * *